(12) United States Patent
Nagarakanti et al.

(10) Patent No.: US 6,421,408 B1
(45) Date of Patent: Jul. 16, 2002

(54) COUNTER LOGIC FOR MULTIPLE MEMORY CONFIGURATION

(75) Inventors: Kailash Nagarakanti, Santa Clara, CA (US); William Baker, Starkville, MS (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 09/894,172

(22) Filed: Jun. 27, 2001

(51) Int. Cl.[7] .................................................. G06M 3/00
(52) U.S. Cl. .............................. 377/26; 377/2; 377/16; 377/51
(58) Field of Search ................................ 377/2, 16, 26, 377/51

(56) References Cited

U.S. PATENT DOCUMENTS 6,253,307 B1 * 6/2001 Boutaud et al. ............ 712/209

* cited by examiner

Primary Examiner—Margaret R. Wambach
(74) Attorney, Agent, or Firm—Wagner Murabito & Hao LLP

(57) ABSTRACT

The present invention is an efficient system and method for flexible masking of output bits from a counter. The maskable counter system and method of the present invention modify the chain carry fed into a counter so that any bit (or bits) of the counter may be masked. A masked bit of a maskable counter system and method is utilized to facilitate user programmable control of multiple configurations in a memory. A maskable counter system comprises a mask register (e.g., a D flip flop), a counter (e.g., a D flip flop), and a masking coordination circuit. The masking coordination circuit permits a carry in signal, a carry out signal, and a counter output bit signal to operate in a normal incrementation manner if a mask bit is not asserted and prevents the counter output bit signal from changing if the mask bit is asserted.

20 Claims, 7 Drawing Sheets

| PHYSICAL | LOGICAL 4M x 18 | LOGICAL 2M x 18 | LOGICAL 4M x 36 | LOGICAL 2M x 36 |
|---|---|---|---|---|
| 17 | 17 | | | |
| 16 | 16 | 16 | 16 | |
| 15 | 15 | 15 | 15 | 15 |
| . | . | . | . | . |
| . | . | . | . | . |
| . | . | . | . | . |
| 1 | 1 | 1 | 1 | 1 |
| 0 | 0 | 0 | 0 | 0 |

FIGURE 1B

| PART | # BITS | DEPTH | WIDTH | LOGICAL COUNTER LENGTH | MASK<17> | MASK<16> |
|---|---|---|---|---|---|---|
| 7C0832 | 4M | 256K | 18 | 18 | U | U |
| 7C0852 | 4M | 128K | 36 | 17 | O | U |
| 7C0831 | 2M | 128K | 18 | 17 | U | O |
| 7C0851 | 2M | 64K | 36 | 16 | O | O |

*U - USER PROGRAMMABLE.

```
┌─────────────────────────────────────────────────────────┐
│ PERMITTING A CARRY IN SIGNAL, A CARRY OUT SIGNAL, A     │
│ CARRY LOOKAHEAD SIGNAL, AND AN ADDRESS OUT BIT SIGNAL   │
│     TO OPERATE IN A NORMAL INCREMENTATION MANNER.       │
│                          410                            │
└─────────────────────────────────────────────────────────┘
                             │
                             ▼
┌─────────────────────────────────────────────────────────┐
│ PREVENTING THE ADDRESS OUT BIT SIGNAL FROM CHANGING IF  │
│   THE MASK BIT INDICATES THE ADDRESS OUT BIT IS NOT     │
│                    PERMITTED TO CHANGE.                 │
│                          420                            │
└─────────────────────────────────────────────────────────┘
                             │
                             ▼
┌─────────────────────────────────────────────────────────┐
│              INCREMENTING A COUNTER BIT VALUE.          │
│                          430                            │
└─────────────────────────────────────────────────────────┘
                             │
                             ▼
┌─────────────────────────────────────────────────────────┐
│            PROVIDING A LOCAL CARRY LOOKAHEAD SIGNAL.    │
│                          440                            │
└─────────────────────────────────────────────────────────┘
                             │
                             ▼
┌─────────────────────────────────────────────────────────┐
│                      STORING A MASK BIT.                │
│                          450                            │
└─────────────────────────────────────────────────────────┘
```

FIGURE 4

COUNTER LOGIC FOR MULTIPLE MEMORY CONFIGURATION

FIELD OF THE INVENTION

The present invention relates to the field of electronic memory design. More particularly, the present invention relates to a system and method for masking counter output bits to prevent them from incrementing.

BACKGROUND OF THE INVENTION

Electronic systems and circuits have made a significant contribution towards the advancement of modern society and are utilized in a number of applications to achieve advantageous results. Numerous electronic technologies such as digital computers, calculators, audio devices, video equipment, and telephone systems have facilitated increased productivity and reduced costs in analyzing and communicating data, ideas and trends in most areas of business, science, education and entertainment. Electronic systems designed to provide these benefits often include counters that increment a value. The incremented values are utilized to support a variety of functions with differing incrementing requirements. Counters capable of providing flexible incrementation configurations to meet the variety of incrementation requirements offer significant advantages. One traditional method of attempting to achieve some flexibility in counting routines is to mask certain output bits of a counter. However, traditional attempts at masking counter output bits typically have relatively limited flexibility and require significant resources to implement.

Most electronic counters are digital and operate on signals representing logical ones and zeroes values. The logical values of a counter output word are typically utilized to form a binary number. FIG. 1A is a block diagram of a typical prior art 4 bit counter system 100. A 4 bit counter system provides a counter output word comprising 4 bits that vary in significance from a least significant bit to a most significant bit. Prior art counter system 100 includes incrementor cells 111 through 114 which produce physical counter output bits 121 through 124 respectively. Counter output bit 121 is the most significant bit and counter output bit 124 is the least significant bit. Counter system 100 increments by 1 from a value of 0000 to 1111. Each incrementor cell performs the incrementation of a corresponding counter output bit depending upon a carry in value from the preceding incrementor cell and the value of the counter output bit during a previous cycle. Each incrementor cell also provide a carry output value which serves as the carry in value for the next incrementor cell.

One type of specialized counter is a burst counter. A burst counter performs an incrementation function by "adding" one to a previous value. Traditional burst counters are often limited in the counting routines they provide since they typically increment by a value of one. Modifying a burst counter to provide additional functionality such as incrementing by a different number typically requires significant additional circuit resources. Burst counters are usually implemented on a silicon semiconductor chip with limited resources. Even when precious chip resources are committed to masking a counter output bit, the masking functionality of a traditional burst counter is very limited.

One approach to achieving additional functionality is to mask counter output bits but this is traditionally limited to masking a most significant bit or a least significant bit. In one traditional counter system with additional masking circuits a most significant bit is masked by preventing a new value from loading in the incrementor and presenting an old value as the counter output bit. One traditional counter system has an extended carry change with a shifter before the increment logic and another after the increment logic which permits incrementation by two instead of incrementing by one. The shifters enabled the traditional counter to mask a least significant bit by shifting down by one bit, incrementing and then shifting up by one bit.

The shifters and counter interrupt logic usually consume significant precious integrated circuit resources to implement. The shifters in a traditional burst counter circuit are usually implemented with a plurality of multiplexers that include numerous logic gate circuits and have separate logic to generate the counter interrupt. These extra traditional circuit resources are typically limited to masking least significant bits or most significant bits. In theory some traditional burst counter circuits providing maskable counter bit functionality could be extended to shift by a plurality of consecutive least or most significant bits which would allow incrementation by powers of 2 (e.g., 4 or 8). However, this theoretical expansion would require an even greater number of additional circuits and consume even greater amounts of precious chip resources. Despite resource consumption, the ability to have flexible masking capabilities is often very important in a variety of implementations, such as utilizing burst counter in memories.

Electronic systems often include memory components for storing information. Information is typically stored in certain areas or locations of a memory referred to as a memory cell. Each memory cell is usually identified by a unique sequential address. Addresses are usually established by incrementing an address counter and it is often advantageous to mask certain bits in the counter, for example to change the logical length of an address counter. In some applications, multiple memory cells are downloaded at a. the same time and the ability to increment the counter by a higher power of 2 permits simplified address decoding. Each memory typically has a maximum number of bits it is capable of storing and the size of each memory cell (e.g., the depth) determines the configuration of the memory within the maximum bit limit. For example, a maximum bit storage value divided by the size or width of the cell determines the number of cells included in a memory and since each cell is identified by a unique address it also provides the number of unique address required by the memory system. FIG. 1B is a tabular listing of the physical and corresponding logical address mapping for different exemplary memory configurations.

What is required is an efficient system and method for flexible masking of output bits from a counter.

SUMMARY

The present invention is an efficient system and method for flexible masking of output bits from a counter. The maskable counter system and method of the present invention modify the chain carry fed into a counter so that any bit (or bits) of the counter may be masked. In one embodiment of the present invention, the masked bits are user programmable. A masked bit of a maskable counter system and method of the present invention is utilized in one implementation to facilitate user programmable control of multiple configurations in a memory. In one embodiment of the present invention, a maskable counter system comprises a mask register (e.g., a D flip flop), a counter (e.g., a D flip flop), and a masking coordination circuit. The masking coordination circuit permits a carry in signal, a carry out signal, a local carry lookahead signal and a counter output bit signal to operate in a normal incrementation manner if a mask bit is not asserted and prevents the counter output bit signal from changing if the mask bit is asserted. The mask register stores the mask bit and the counter provides a counter output bit signal. In one embodiment, the present invention also has an option input that facilitates changing one die into different configurations and masking any counter output bit in a counter output word (including most significant bits, least significant bits, and bits other than the most significant or least significant).

DESCRIPTION OF THE DRAWINGS

FIG. 1B is a tabular listing of the physical and corresponding logical address mapping for different memory configurations.

FIG. 3C is a table showing the masking logic required for implementing different memory configurations by masking counter output pins in one exemplary implementation.

FIG. 4 is a flow chart of a maskable counter method, one embodiment of the present invention.

DETAILED DESCRIPTION

Reference will now be made in detail to the preferred embodiments of the invention, a maskable counter system and method, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

The present invention is maskable counter system and method that provides independent incrementation control of each counter bit in a counter output word by providing counter output bit masking capabilities. The maskable counter system and method of the present invention permits a counter output bit to increment in a normal incrementation manner or masks the counter output bit (prevents a logical value of a counter output bit from impacting the incrementation of a counter output word). Masking a counter output bit permits greater functionality such as changes the logical length of a counter, permits incrementation of an counter output word by a power of 2, and simplifies decoding. A masked counter output bit may be utilized to utilized to assist performance of a variety of operations including controlling a data configuration multiplexer, configuring a memory for different width and depths, and a carry chain of a masked bit may be used to generate a counter interrupt. The present invention provides the added counter output bit flexibility with a relatively small requirement for additional circuits and does not slow down the address path.

Figure 1A:
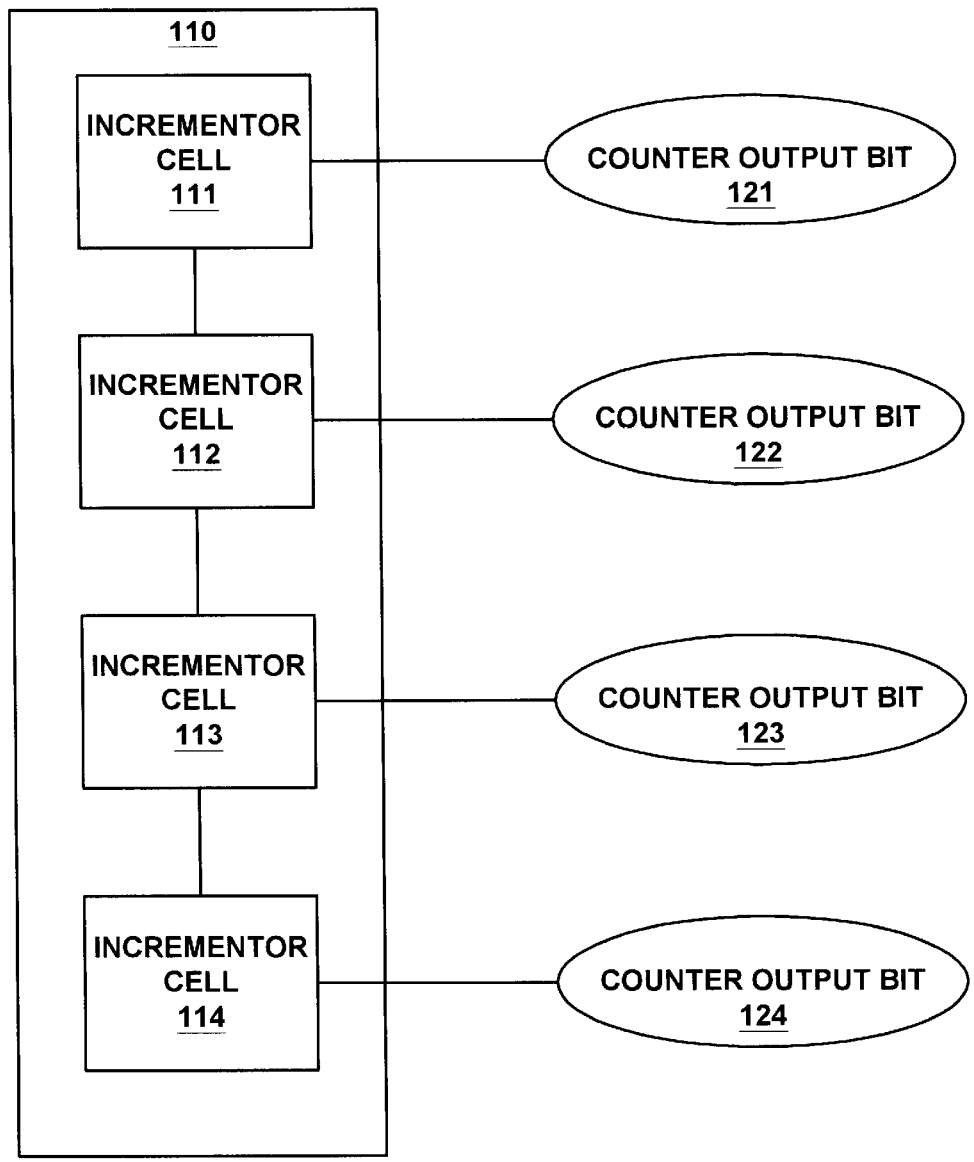
FIG. 1A is a block diagram of a typical prior art 4 bit counter system.
Figure 2:
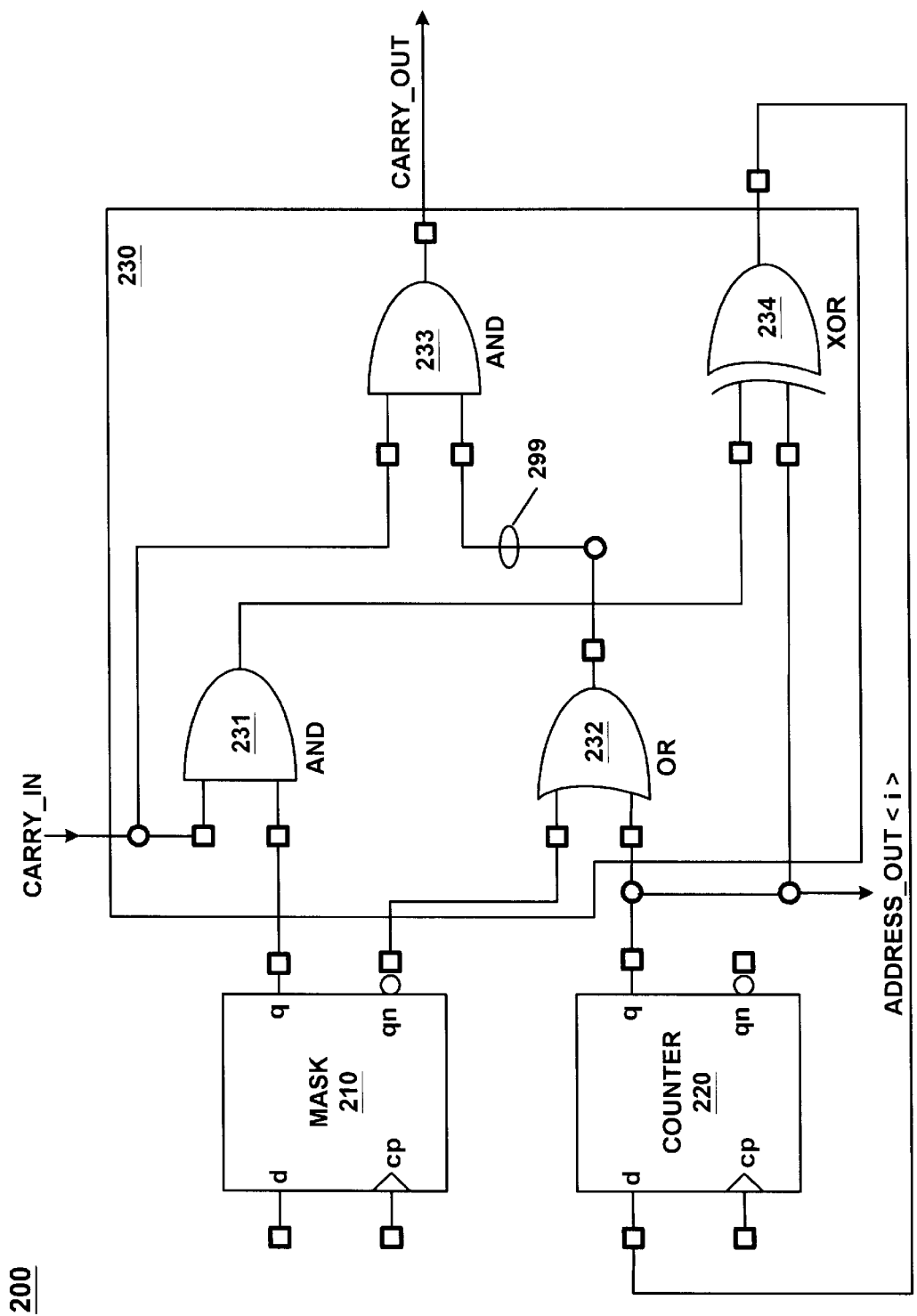
FIG. 2 is a block diagram of one embodiment of a maskable counter system of the present invention.

FIG. 2 is a block diagram of maskable counter system 200, one embodiment of the present invention. Maskable counter system 200 comprises a mask register 210 (e.g., a first D flip flop), counter 220 (e.g., a second D flip flop), masking coordination circuit 230. Masking coordination circuit 230 is coupled to mask register 210 and counter 220. The components of maskable counter incrementor system 200 cooperatively operate to provide incrementation of a counter output bit and flexible control of counter output bit masking. Masking coordination circuit 230 permits a counter output bit signal (e.g. address_out <>signal) to increment in a normal incrementation manner if a mask bit is not asserted and prevents the logical value of the counter output bit from incrementing (e.g., changing) if the mask bit is asserted. Mask register 210 stores a mask bit that indicates a counter output signal is prevented from incrementing when it is asserted or permitted to increment when the mask bit is not asserted. Counter 220 provides a counter output bit signal.

In one embodiment of the present invention, masking coordination circuit 230 comprises carry in mask coordination circuit 231 (e.g., a first AND gate), local carry lookahead mask resolution circuit 232 (e.g., an OR gate), carry out circuit 233 (e.g., a second AND gate) and output mask coordination circuit 234 (e.g., an exclusive OR gate). Output mask coordination circuit 234 is coupled to mask coordination circuit 231 and local carry lookahead mask resolution circuit 232 is coupled to carry out circuit 233. Mask coordination circuit 231 forwards the logical value of a carry in signal to output mask coordination circuit 234 unless the mask bit in mask register 210 is asserted. Local carry lookahead mask resolution circuit 232 resolves the logical value of the mask bit status and the output of counter 220 to provide an appropriate local carry lookahead signal (e.g., 299) logical value. Carry out circuit 233 analyzes the logical value of a local carry lookahead signal and the logical value of a carry in signal to provide an appropriate carry out signal. Output mask coordination circuit 234 coordinates the output of carry in mask coordination circuit 231 and the output of counter 220 from a previous cycle to provide an appropriate logical value input to counter 220.

An appropriate value for the carry out signal, the local carry lookahead signal and the counter output bit signal depends upon whether the mask bit of a mask register is asserted. If a mask bit is not asserted the logical values of the carry out signal, and the counter output bit signal are incremented in a normal manner. If a mask bit is asserted the logical values of the counter output bit signal does not change and the logical value of the carry out signal is based upon the carry in signal associated with incrementations of the previous (e.g., lower significant) counter output bit. The logical value of the carry in signal is forwarded as the logical value of the carry out signal to the next address bit (e.g., the next highest significant address bit). The carry in signal to a masked counter bit is essentially forwarded as the carry in bit to the next highest significant counter bit. Since the controlled counter output bit signal is masked and does not change it does not impact the incrementations of the next address bit.

Maskable counter incrementor system 200 facilitates masking out any bits of a counter output word by asserting a mask bit associated with that counter bit. While maskable counter incrementor system 200 facilitates masking of the most significant or least significant bits, it is not limited to masking of the most significant or least significant bits. In one exemplary implementation of the present invention, a mask bit associated with a least significant bit of a counter output word is asserted and the least significant counter output bit (e.g., counter output bit zero) is masked causing the counter output word to be incremented by two. In one exemplary implementation of the present invention a mask bit is asserted for a plurality of counter output bits in a counter output word and the counter output word is incremented by a power of 2. In one embodiment of the present invention, no additional logic gates are placed in the speed critical carry in to carry out path. In one exemplary implementation of the present invention the carry chain is utilized to generate the counter interrupt. In one embodiment of the present invention a counter output bit is programmable when said mask bit is asserted.

Figure 3A:
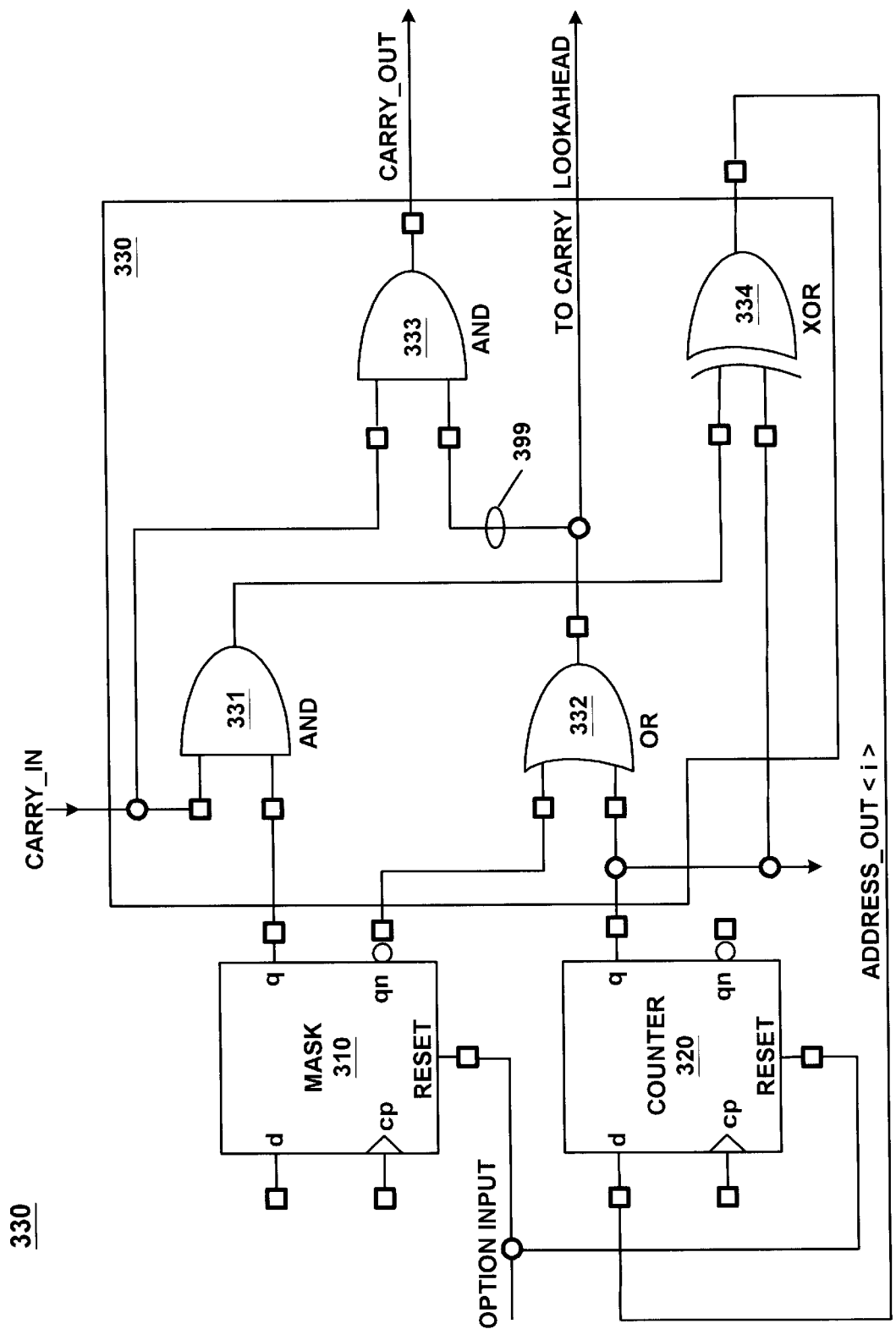
FIG. 3A is a block diagram of one embodiment of a maskable counter system of the present invention with a bonding option.

FIG. 3A is a block diagram of maskable counter system 300, one embodiment of the present invention. Maskable counter system 300 is similar to maskable counter system 200 except maskable counter system 300 includes an option input (e.g., a bond option, fuse, configuration register, etc.) that permits greater flexibility in masking and controlling counter output bits. In one embodiment of maskable counter system 300, a local carry lookahead signal (e.g., 399) is also utilized as a carry lookahead signal to another cell.

Maskable counter system 300, comprises a mask register 310 (e.g., a D flip flop), counter 320 (a D flip flop), and masking coordination circuit 330. Masking coordination circuit 330 is coupled to mask register 310 and counter 320. The components of maskable counter incrementor system 300 cooperatively operate to modify the chain carry fed into a counter 320 so that any bit (or bits) of the counter may be masked. Masking coordination circuit 330 permits a carry in signal, a carry out signal, an address out bit signal and a carry lookahead signal (if included) to operate in a normal incrementation manner if a mask bit is not asserted and prevents the address out bit signal from changing if the mask bits asserted. Mask register 310 stores a mask bit that indicates whether an address out bit signal is prevented from incrementing or permitted to increment. Counter 320 provide an address out bit signal. Mask register 310 and Counter 320 are also reset by a reset signal that is triggered by an option input.

In one implementation of the present invention, maskable counter system 300 is utilized as a full-depth address incrementor for a multiple configuration memory. Mask register 310 is a user programmable mask register utilized to provide a mask bit that prevents or permits a incrementation of a counter bit. The memory is configured for different depths and widths using an option input of the maskable counter system 300 which provides counters of different lengths to match the different configurations by masking counter output bits. In one embodiment of the present invention, the two most significant bits of the mask register are used to configure the device by forcing them to zero using the option input coupled to the reset of the mask register 310 and counter 320. In one exemplary implementation in which the present invention utilized to provide multiple memory configurations, internally the memory has a word particular width of bits (e.g., x36) and a data configuration multiplexer is used to implement a configuration with a different word width (e.g., x18). This configuration multiplexer is controlled by a masked bit of a counter output word.

Figure 3B:
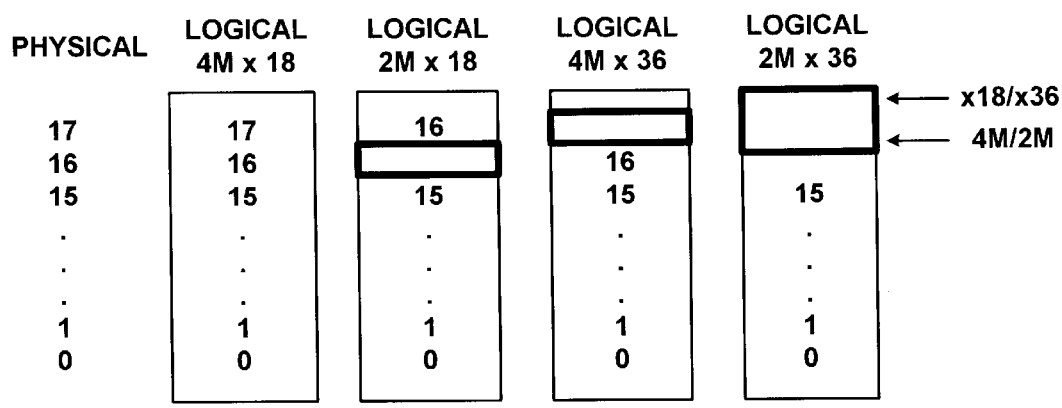
FIG. 3B is an exemplary tabular listing of the physical and corresponding logical address mapping for achieving different memory configurations by masking counter output pins.

In one exemplary implementation of the present invention the counter providing incrementation functions for the memory has masking capabilities and a x18/x36. data MUX in a shifter is controlled by physical address bit 17 for the 4M options, and for the 2M options. Thus, physical bit 17 is used for x18parts and for x36parts it is "forced" to a logical zero value and bit 16 is used for 4M parts and for 2M parts it is "forced" to a logical zero value. FIG. 3B is an exemplary tabular listing of the physical and corresponding logical address mapping for achieving different memory configurations by masking counter output pins. FIG. 3C is a table showing the masking logic required for implementing different memory configurations by masking counter output pins in one exemplary implementation. FIG. 3C indicates that mask bit 17 is forced to a logical zero value for 36 bit width and is user programmable for 18 bit widths and mask bit 16 is user programmable for four megabit memories and forced to a logical zero for two megabit memories.

FIG. 4 is a flow chart of maskable counter method 400, one embodiment of the present invention. Maskable counter method 400 provides flexible control of counter output bit masking. In one embodiment of maskable counter method 400, any bit in a counter output word is programmably maskable. In one implementation of maskable counter method 400 facilitates multiple memory configurations by utilizing a masked counter output bit to determine a memory width or depth.

In step 410 a carry in signal, a carry out signal, a carry lookahead signal (if included) and an address out bit signal are permitted to operate in a normal incrementation manner if a mask bit is not asserted. In one exemplary implementation of the present invention, an unasserted mask bit indicates the logical value of a counter output bit signal is permitted to increment (change).

In Step 420 the logical value of the counter output bit signal is masked and prevented from changing if the mask bit is asserted. In one embodiment of the present invention, the logical value of any counter output bit in a counter output word is masked and prevented from changing if the mask bit is asserted. In one exemplary implementation an asserted mask bit indicates the logical value of the counter output signal is not permitted to increment. In one exemplary implementation of the present invention, a carry chain is modified to provide the logical value of a counter output bit from a previous cyde to the input of a counter if a mask bit is asserted.

In step 430 a carry look ahead signal is provided. In one embodiment of the present invention, the logical value of a carry in signal is forwarded as a carry look ahead signal without consideration of the logical value of the masked counter output bit if a mask bit is asserted. If the mask bit is not asserted the local carry lookahead logical value and the carry in logical value are analyzed to provide and appropriate carry out signal.

In step 440 a mask bit is stored. In one embodiment of the present invention the mask bit is stored in a mask register (e.g., mask register 210). The mask bit is asserted to indicate the logical value of a counter output bit is not permitted to change. In one embodiment of the present invention, asserting a mask bit resulting in the Masking of a counter output bit and an incrementation of a counter output word by a value of one. In one exemplary implementation of the present invention, the counter output word value is incremented by a power of 2 (e.g., by 2, 4, 8, etc.).

In step 450 a counter output word with maskable counter output bits is utilized to configure a memory. The memory is configured for different depths and widths using option inputs (e.g., a bond option, fuse, configuration register, etc.)

which provide counters of different lengths to match the different configurations by masking counter output bits. In one embodiment of the present invention, the two most significant bits of the counter are used to configure the memory device by forcing them to zero using an option input. In one exemplary implementation in which the present invention is utilized to provide multiple memory configurations, internally the memory has a word particular width of bits (e.g., ×36) and a data configuration multiplexer is used to implement a configuration with a different word width (e.g., ×18). This configuration multiplexer is controlled by a masked bit of a counter output word.

Thus the present invention provides a system and method for flexible masking of output bits from a counter. The maskable counter system and method of the present invention modify the chain carry fed into a counter so that any bit (or bits) of the counter may be masked, not just the most significant or least significant bits. In one embodiment of the present invention, the masked bits are user programmable. A masked bit of a maskable counter system and method of the present invention is utilized in one implementation to facilitate programmable memory configuration and control of a data configuration multiplexer. A masked counter system and method of the present invention facilitates reduction of additional logic required to implement counter output bit masking and counter interrupt generation.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A maskable counter system comprising:
 a masking coordination circuit for permitting a counter output bit signal to operate in a normal incrementation manner if a mask bit is not asserted and prevents said counter output bit signal from incrementing if said mask bit is asserted;
 a mask register for storing a mask bit that indicates whether a logical value of said counter output bit signal is prevented from incrementing or permitted to increment, said mask register coupled to said masking coordination circuit; and
 a counter for providing said counter output bit signal, said counter coupled to said masking coordination circuit.

2. A maskable counter system of claim 1 wherein said mask bit is asserted for any counter output bit in a counter output word and said counter output bit is masked.

3. A maskable counter system of claim 1 wherein said mask bit is asserted for a least significant counter output bit in a counter output word and the counter output word is incremented by 2.

4. A maskable counter system of claim 1 wherein said mask bit is asserted for a plurality of counter output bits in a counter output word and the counter output word is incremented by a power of 2.

5. A maskable counter system of claim 1 wherein said masking coordination circuit comprises:
 a local carry lookahead mask resolution circuit for providing an appropriate logical value for a local carry lookahead signal based upon resolving the logical value of said mask bit status and the logical value of said counter output bit signal from said counter;
 a carry out circuit for providing an appropriate carry out signal based upon an analysis of the logical value of said local carry lookahead signal and the logical value of a carry in signal, said carry out circuit coupled to said local carry lookahead mask resolution circuit;
 a mask coordination circuit for forwarding a carry in logical value unless a mask bit is asserted, said mask coordination circuit coupled to said carry out circuit; and
 output mask coordination circuit for coordinating said mask coordination circuit and an output value from said counter from a previous cycle to provide an appropriate input logical value to said counter, said output mask coordination circuit coupled to said mask coordination circuit.

6. A maskable counter system of claim 1 wherein said masking coordination circuit provides a carry out signal and a local carry lookahead signal that are utilized to generate a counter interrupt.

7. A maskable counter system of claim 1 wherein said counter output bit is programmable when said mask bit is asserted.

8. A maskable counter system comprising:
 a masking coordination circuit for permitting a counter output bit signal to operate in a normal incrementation manner if a mask bit is not asserted and prevents said counter output bit signal from incrementing if said mask bit is asserted;
 a mask register for storing a mask bit that indicates whether a logical value of said counter output bit signal is prevented from incrementing or permitted to increment, said mask register coupled to said masking coordination circuit;
 a counter for providing said counter output bit signal, said counter coupled to said masking coordination circuit; and
 an option input for resetting said mask register and said counter, said option input coupled to said mask register and said counter register.

9. A maskable counter system of claim 8 wherein said masking coordination circuit comprises:
 a local carry lookahead mask resolution circuit for providing an appropriate logical value for a local carry lookahead signal based upon resolving the logical value of said mask bit status and the logical value of said counter output bit signal from said counter;
 a carry out circuit for providing an appropriate carry out signal based upon an analysis of the logical value of said local carry lookahead signal and the logical value of a carry in signal, said carry out circuit coupled to said local carry lookahead mask resolution circuit;
 a mask coordination circuit for forwarding a carry in logical value unless a mask bit is asserted, said mask coordination circuit coupled to said carry out circuit; and
 output mask coordination circuit for coordinating said mask coordination circuit and an output value from said counter from a previous cycle to provide an appropriate input logical value to said counter, said output mask coordination circuit coupled to said mask coordination circuit.

10. A maskable counter system of claim 8 wherein said masked bit is programmable by the user and is utilized to control a memory configuration multiplexer.

11. A maskable counter system of claim 8 wherein said mask bit is asserted for any counter output bit in a counter output word and said counter output bit is masked.

12. A maskable counter system of claim 8 wherein said mask bit is asserted for a least significant counter output bit in a counter output word and the counter output word is incremented by 2.

13. A maskable counter system of claim 8 wherein said mask bit is asserted for a plurality of counter output bits in a counter output word and the counter output word is incremented by a power of 2.

14. A maskable counter system of claim 8 wherein said mask bit is asserted for a counter output bit and said counter output bit is utilized to configure a memory depth or width.

15. A maskable counter method comprising the steps of:

permitting a carry in signal, a carry out signal, and a counter output bit signal to operate in a normal incrementation manner if a mask bit is asserted;

preventing said counter output bit signal from changing if said mask bit is not asserted; and storing a mask bit.

16. The maskable counter method of claim 15 further comprising the step masking any bit in a counter output word.

17. The maskable counter method of claim 15 further comprising the step of utilizing a counter output word with maskable counter output bits to configure a memory.

18. The maskable counter method of claim 15 further comprising the step of incrementing a counter bit value.

19. The maskable counter method of claim 19 wherein said counter bit value is incremented by a power of 2.

20. The maskable counter method of claim 15 further comprising the step of providing a carry ahead signal.

* * * * *